United States Patent
Chin et al.

(10) Patent No.: US 9,417,918 B2
(45) Date of Patent: Aug. 16, 2016

(54) COMPUTING SESSION WORKLOAD SCHEDULING AND MANAGEMENT OF PARENT-CHILD TASKS

(71) Applicant: International Business Machines Corporation, Armonk, NY (US)

(72) Inventors: Alicia E. Chin, Markham (CA); Yonggang Hu, Toronto (CA); Zhenhua Hu, Toronto (CA); Jason T S Lam, Markham (CA); Zhimin Lin, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 14/084,918

(22) Filed: Nov. 20, 2013

(65) Prior Publication Data

US 2015/0143381 A1 May 21, 2015

(51) Int. Cl.
*G06F 9/50* (2006.01)
*G06F 9/48* (2006.01)

(52) U.S. Cl.
CPC .............. *G06F 9/5005* (2013.01); *G06F 9/485* (2013.01); *G06F 9/4881* (2013.01); *G06F 2209/484* (2013.01)

(58) Field of Classification Search
None
See application file for complete search history.

(56) References Cited

U.S. PATENT DOCUMENTS

| 8,290,805 | B2 | 10/2012 | Usui |
| 2003/0120710 | A1 | 6/2003 | Pulsipher et al. |
| 2005/0114862 | A1 | 5/2005 | Bisdikian et al. |
| 2011/0071869 | A1 | 3/2011 | O'Brien et al. |
| 2011/0072436 | A1 | 3/2011 | Gilat et al. |
| 2011/0191780 | A1* | 8/2011 | Viswanathan ........... G06F 3/061 718/102 |
| 2012/0023498 | A1* | 1/2012 | Sundararaman ...... H04L 47/621 718/102 |
| 2012/0036334 | A1* | 2/2012 | Horman ................ G06F 12/109 711/165 |
| 2012/0137299 | A1* | 5/2012 | Moyer .................. G06F 3/0613 718/102 |
| 2013/0263148 | A1* | 10/2013 | Brueggen .............. G06F 9/5016 718/104 |
| 2014/0337389 | A1* | 11/2014 | Ricketts ............ G06F 17/30292 707/803 |

FOREIGN PATENT DOCUMENTS

EP        1387267 A1    2/2004

OTHER PUBLICATIONS

U.S. Appl. No. 14/862,979, filed Sep. 23, 2015.
(Continued)

*Primary Examiner* — Abdullah Al Kawsar
*Assistant Examiner* — Michael Ayers
(74) *Attorney, Agent, or Firm* — Daniel R. Simek; Maeve M. Carpenter (57) ABSTRACT

A single workload scheduler schedules sessions and tasks having a tree structure to resources, wherein the single workload scheduler has scheduling control of the resources and the tasks of the parent-child workload sessions and tasks. The single workload scheduler receives a request to schedule a child session created by a scheduled parent task that when executed results in a child task; the scheduled parent task is dependent on a result of the child task. The single workload scheduler receives a message from the scheduled parent task yielding a resource based on the resource not being used by the scheduled parent task, schedules tasks to backfill the resource, and returns the resource yielded by the scheduled parent task to the scheduled parent task based on receiving a resume request from the scheduled parent task or determining dependencies of the scheduled parent task have been met.

9 Claims, 5 Drawing Sheets

(56) References Cited

OTHER PUBLICATIONS

Brelsford et al., "Partitioned Parallel Job Scheduling for Extreme Scale Computing", IBM Systems and Technology Group, 16th International Workshop, JSSPP 2012, China, May 25, 2012. pp. 157-177, <http://www.cs.huji.ac.il/~feit/parsched/jsspp12/p9-brelsford.pdf>.

IBM, "The Parent-child Feature", Tivoli Software, <http://publib.boulder.ibm.com/tividd/td/ITWS/SC32-1278-00/en_US/HTML/TWSAPPEX156.htm>.

IBM, "IBM Platform Symphony V6.1 enables scalable, high-performance grid services for parallel compute- and data-intensive analytic applications", IBM United States Software Announcement 212-426, dated Nov. 13, 2012.

* cited by examiner

COMPUTING SESSION WORKLOAD SCHEDULING AND MANAGEMENT OF PARENT-CHILD TASKS

STATEMENT REGARDING PRIOR DISCLOSURES BY THE INVENTOR OR A JOINT INVENTOR

The following disclosure(s) are submitted under 35 U.S.C. 102(b)(1)(A): DISCLOSURE(S): Product release Announcement titled "IBM Platform Symphony V6.1 enables scalable, high-performance grid services for parallel compute- and data-intensive analytic applications", for a product made publicly available on Dec. 14, 2012, page(s) 2, Planned Availability Date section.

BACKGROUND OF THE INVENTION

The present invention relates generally to the field of distributed computing, and more particularly to task scheduling and management of parent-child and recursive tree computational workloads.

In grid computing, the parent-child workload pattern is one in which an initial client process will submit one or more tasks to the workload scheduler to be computed in parallel and asynchronously on the grid. Tasks are computations that can be executed in parallel in a grid or a cluster of computing devices. A task runs on a service instance. Service instances are self-contained processes performing computation or logic. The execution of a task is by one or more threads of a process of a service instance.

Each submitted task may further decompose into smaller sub-tasks that can also be submitted to the scheduler to be run in parallel and asynchronously on the grid. Task decomposition can occur for many levels or what are sometimes referred to as "generations" of tasks. Decomposition of tasks for many levels in which parent tasks have dependencies on child tasks are referred to as "recursive decomposition".

Tasks that decompose into sub-tasks are "parent tasks" to their sub-tasks. The sub-tasks of a parent task are known as "child tasks" of the parent task. A "root" task is the task directly submitted by a client to the grid computing environment, and does not have a parent task. The full decomposition of the root task into all of its generations of sub-tasks can be compared to the structure of an inverted tree, in which the leaves of the tree correspond to child tasks that have no children tasks or sub-tasks of their own.

The workflow pattern of the inverted parent-child tree structure has a characteristic in which the parent task has a dependency on its corresponding child task(s). Before the parent task can generate a result, the child task(s) must complete and provide results to the parent task.

BRIEF SUMMARY

Embodiments of the present invention disclose a computer program product and system for parent-child scheduling and management of a computer workload. A computer processor schedules, by a single workload scheduler, parent-child workload sessions and tasks in a tree structure of sessions and tasks submitted by a client application, to resources available to the single workload scheduler, wherein the single workload scheduler has scheduling control of the resources available to the single workload scheduler, and the tasks of the tree structure of the parent-child workload sessions and tasks submitted to the single workload scheduler. The computer processor receives, by the single workload scheduler, a request to schedule a child session created from a scheduled parent task of the client application that when executed results in a child task, the scheduled parent task dependent on a result of the child task. The computer processor receives, by the single workload scheduler, a message from the scheduled parent task yielding a resource to the single workload scheduler based on the resource not being intensively used by the scheduled parent task, and the computer processor returns the resource yielded by the scheduled parent task to the scheduled parent task based on receiving a resume request from the scheduled parent task and determining dependencies of the scheduled parent task have been met.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer-readable medium(s) having computer-readable program code/instructions embodied thereon.

Any combination of computer-readable storage media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD- ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages, and scripting languages, such as Python. The program code may execute entirely on a user's computer, partly on the user's computer, as a stand-alone software package, partly on the user's computer and partly on one or more remote computers or entirely on the one or more remote computers or servers. In the latter scenario, the one or more remote computers may be connected to the user's computer through any type communications fabric, such as a PCIe bus, or network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps or parallel steps, to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
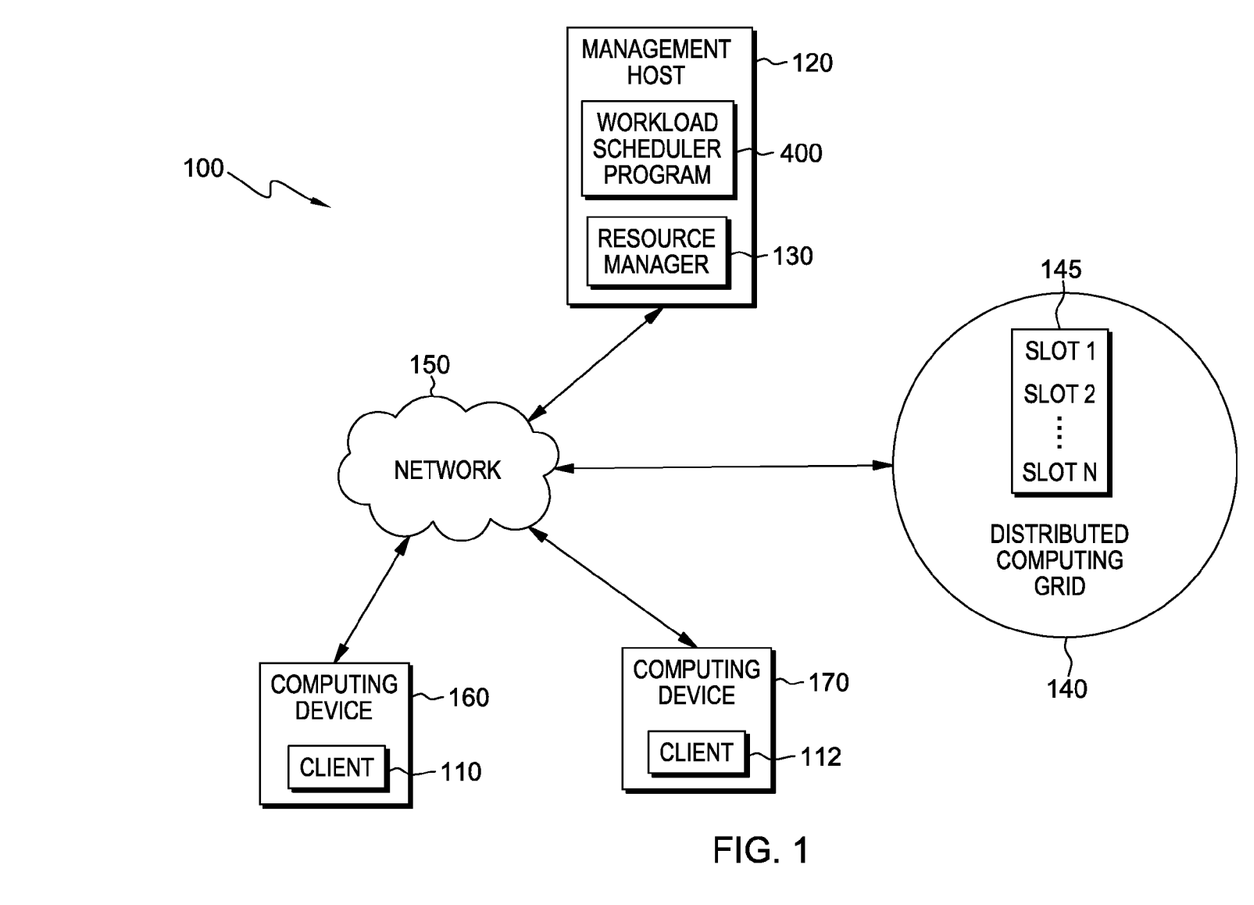
FIG. 1 is a functional block diagram illustrating a distributed computing grid environment, in accordance with an embodiment of the present invention.

The present invention will now be described in detail with reference to the Figures. FIG. 1 is a functional block diagram illustrating a distributed computing grid environment, generally designated 100, in accordance with one embodiment of the present invention. Distributed computing grid environment 100 includes management host 120, distributed computing grid 140, and computing devices 160 and 170, all interconnected through network 150. Management host 120 includes workload scheduler program 400 and resource manager 130. Distributed computing grid 140 includes resource slots 145, representing the "slots" within distributed computing grid 140, which are units of resources (e.g., central processing units (CPUs) running service instances, etc.) to which tasks can be scheduled to be run.

Tasks are computations or logic functions that can be executed in parallel in a computing cluster or grid, such as distributed computing grid environment 100. Groupings of one or more tasks form a "session", also referred to as a "job", which acts as a container for tasks. How tasks are grouped into sessions is determined by the logic of the application running within distributed computing grid environment 100. Tasks run within an application program called a "service instance", which is a running instance of a service and can be reused to run multiple tasks. A service provides a software function to a client, which can be an application running within distributed computing grid environment 100.

Management host 120 is a computing device that controls the assignment of resources of distributed computing grid 140, to various client application requests, such as clients 110 and 112 operating on computing devices 160 and 170 respectively. Management host 120 is depicted as connected to distributed computing grid 140 via network connection. Alternatively, management host 120 may be included as part of distributed computing grid 140. Management host 120 is a server computing device that can be a desktop computer, a laptop computer, a specialized computer server, a client computer, a tablet, or a netbook personal computer (PC), a personal digital assistant (PDA), a smart phone, a mainframe computer, a web server computer, or a networked server computer. Further, management host 120 can represent computing systems utilizing clustered computers and components to act as single pools of seamless resources when accessed through network 150, as is common in data centers and with cloud computing applications. In general, management host 120 is representative of any programmable electronic device or combination of programmable electronic devices capable of executing machine-readable program instructions. Management host 120 may include internal and external hardware components, as depicted and described in further detail with respect to FIG. 5.

Management host 120 includes workload scheduler program 400 and resource manager 130. Management host 120 may be comprised of one or more computing devices such that resource manager 130 and workload scheduler program 400 may reside on one, or separate computing devices that act as a single resource. Management host 120, as well as distributed computing grid 140, can include an operating system (OS) program layer, a middleware program layer, and an application program layer. Among other components, the middleware program layer includes components of resource management, controlled by resource manager 130, and workload management, controlled by workload scheduler program 400. Resource manager 130 controls assignment and adjustment of resources used to perform tasks as submitted by client applications with access to distributed computing grid 140. Resource manager 130 provides at least a minimum agreed-to level of resources of distributed computing grid 140 to using entities based on a policy or an established service level agreement (SLA), when required by workload demand. In one configuration, resource manager 130 determines unused resources from under-using entities, and makes the resources available to entities with high demand that can benefit from use of additional available resources. In this manner resources are used to achieve higher efficiencies in an environment in which resources are shared, such as distributed computing grid environment 100.

In an embodiment of the present invention, workload scheduler program 400 is depicted as operating on management host 120. In an alternative embodiment, workload scheduler program 400 can run as separate processes across multiple computing devices. Workload scheduler program 400 manages and schedules the tasks included in session requests received from client applications. Workload scheduler program 400 reflects the scheduling priority of tasks from the client application, given the available resources as determined by resource manager 130. Tasks are run after workload scheduler program 400 has assigned a task to a slot (resource). Workload scheduler program 400 reflects the task priority, and makes use of application programming interfaces (APIs) provided by the workload management component and supporting instructions enabling tasks to indicate when they are not actively using a resource assigned to the task.

Computing devices 160 and 170 are components of distributed computing grid environment 100 capable of operating one or more applications that generate sessions that include workload tasks. Computing devices 160 and 170 are depicted as connected to distributed computing grid 140, but alternatively may be included within distributed computing grid 140. Computing device 160 includes client 110, and computing device 170 includes client 112. Clients 110 and 112 are application programs capable of submitting session requests to workload scheduler program 400 and submitting tasks within respective sessions to run on resource slots 145 available in distributed computing grid 140.

Computing devices 160 and 170 can each be a desk top computer, a laptop computer, a specialized mobile computer server, a client computer, a tablet, or a netbook personal computer (PC), a personal digital assistant (PDA), a smart phone, a mainframe computer, a web server computer, a networked server computer or any computing device capable of downloading and operating an application from a communications fabric connection, such as a PCIe bus, or a network connection. In general, computing devices 160 and 170 are representative of any programmable electronic device or combination of programmable electronic devices capable of executing machine-readable program instructions. Computing devices 160 and 170 include internal and external hardware components, as depicted and described in further detail with respect to FIG. 5.

Network 150 can be, for example, a local area network (LAN), a wide area network (WAN), such as the Internet, or a combination of the two, and can include wired or wireless connections. Network 150 can be a communication fabric within or between computer processors, such as a PCIe bus. In general, network 150 can be any combination of connections and protocols that will support communications via various channels between clients computing devices 160 and 170, management host 120 and distributed computing grid 140, in accordance with an embodiment of the present invention.

Figure 2A:
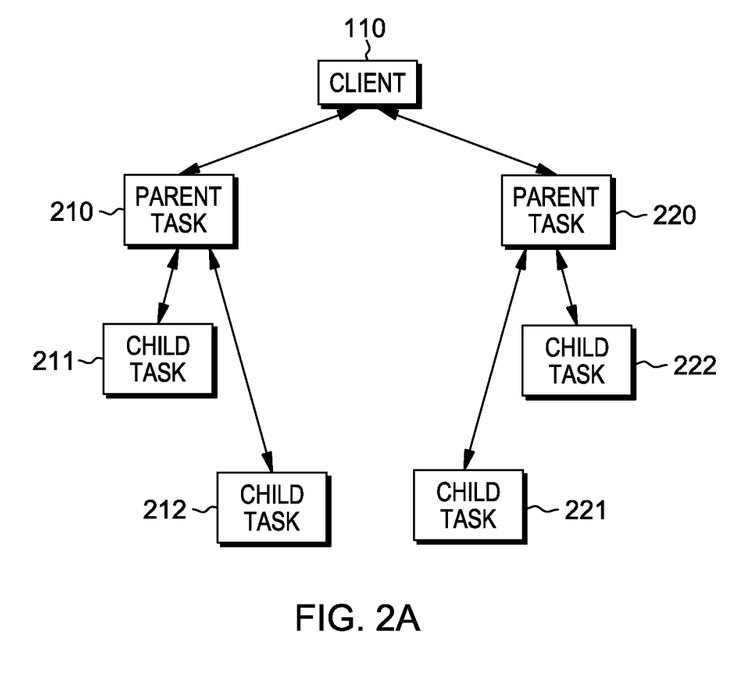
FIG. 2A is a block diagram illustrating resource constraints of a parent-child workload, in accordance with an embodiment of the present invention.

FIG. 2A is a block diagram illustrating a parent-child workload task relationship, in accordance with an embodiment of the present invention. FIG. 2A includes client 110, which is an application running on computing device 160 that initiates a session that includes two tasks, parent task 210 and parent task 220. Parent task 210, when performed on a resource slot, decomposes to additional tasks to be performed, child task 211 and child task 212. A task that produces or decomposes to form one or more additional tasks may have a dependency on the completion of the additional tasks. This dependency relationship is referred to as a parent-child relationship of workload tasks. In this relationship of tasks, the child tasks need to complete in order for the parent task to complete.

Given the dependency relationship, parent task 210 must wait for child tasks 211 and 212 to complete and return the results to parent task 210 before parent task 210 can complete, returning results to client 110. Similarly parent task 220, when run, decomposes to child tasks 221 and 222. Given a similar dependency relationship, child tasks 221 and 222 must complete and return results to parent task 220 before parent task 220 can complete, returning results to client 110.

Parent-child task relationships can extend for many levels, each level referred to as a "generation", and each task that produces a sublevel task is a parent task to the sublevel task, and each sublevel task is a child to the parent task from which the sublevel task was produced. The extended relationship of several generations forms a structure that may resemble a tree, with the branches of the tree connecting parent and child tasks, and the last set of child tasks that have no additional task dependencies are the leaves of the tree structure.

Figure 2B:
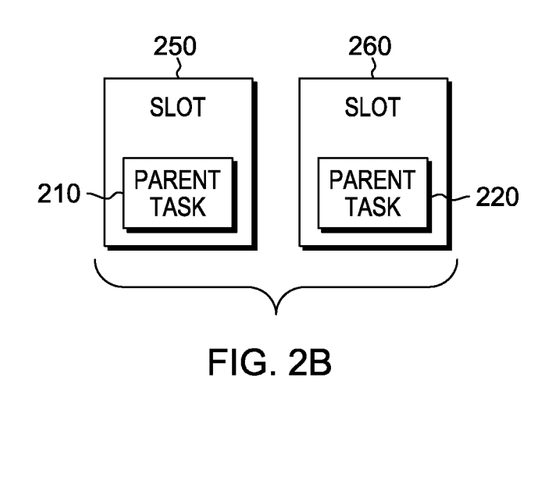
FIG. 2B is a block diagram illustrating resources of a parent-child workload, in accordance with an embodiment of the present invention.

FIG. 2B is a block diagram illustrating a resource constraint, in accordance with an embodiment of the present invention. FIG. 2B includes slot 250 and slot 260, both of which are computing resources of resource slots 145 within distributed computing grid 140. A slot is a representation of one or more resources, typically hardware or software resources, used to run a computer program. A slot could represent two CPUs, a CPU and 1 GB or memory, etc. Although the resources included within resource slots 145 may include, but are not limited to, CPUs, memory, disk space, software, and I/O channels, for simplicity and example purposes, references made to slots or resources herein, refer to CPUs. Client 110 submits a session to workload scheduler program 400. The session includes parent tasks 210 and 220 (see FIG. 2A), and parent tasks 210 and 220 may be submitted by client 110 to the session individually. Workload scheduler program 400 has been allocated two slots by resource manager 130, slot 250 and slot 260. Workload scheduler program 400 schedules parent task 210 to slot 250 and schedules parent task 220 to slot 260, resulting in a resource constraint.

Parent task 210 (FIG. 2A), decomposes to child tasks 211 and 212; however, there are no slots available on which to schedule child tasks 211 and 212. Similarly, parent task 220 decomposes to child tasks 221 and 222, for which there are also no slots available. To finish, parent tasks 210 and 220 require their children tasks to finish; however, there are no available slots to which the child tasks can be scheduled as long as parent tasks 210 and 220 continue to occupy the only available resources, slots 250 and 260, respectively, until parent tasks 210 and 220 are finished. The condition in which there are additional tasks to be scheduled, but no resources are available to which tasks can be scheduled, is a scheduling deadlock. Parent-child workload patterns are susceptible to scheduling deadlock when the number of resources is limited.

Figure 3:
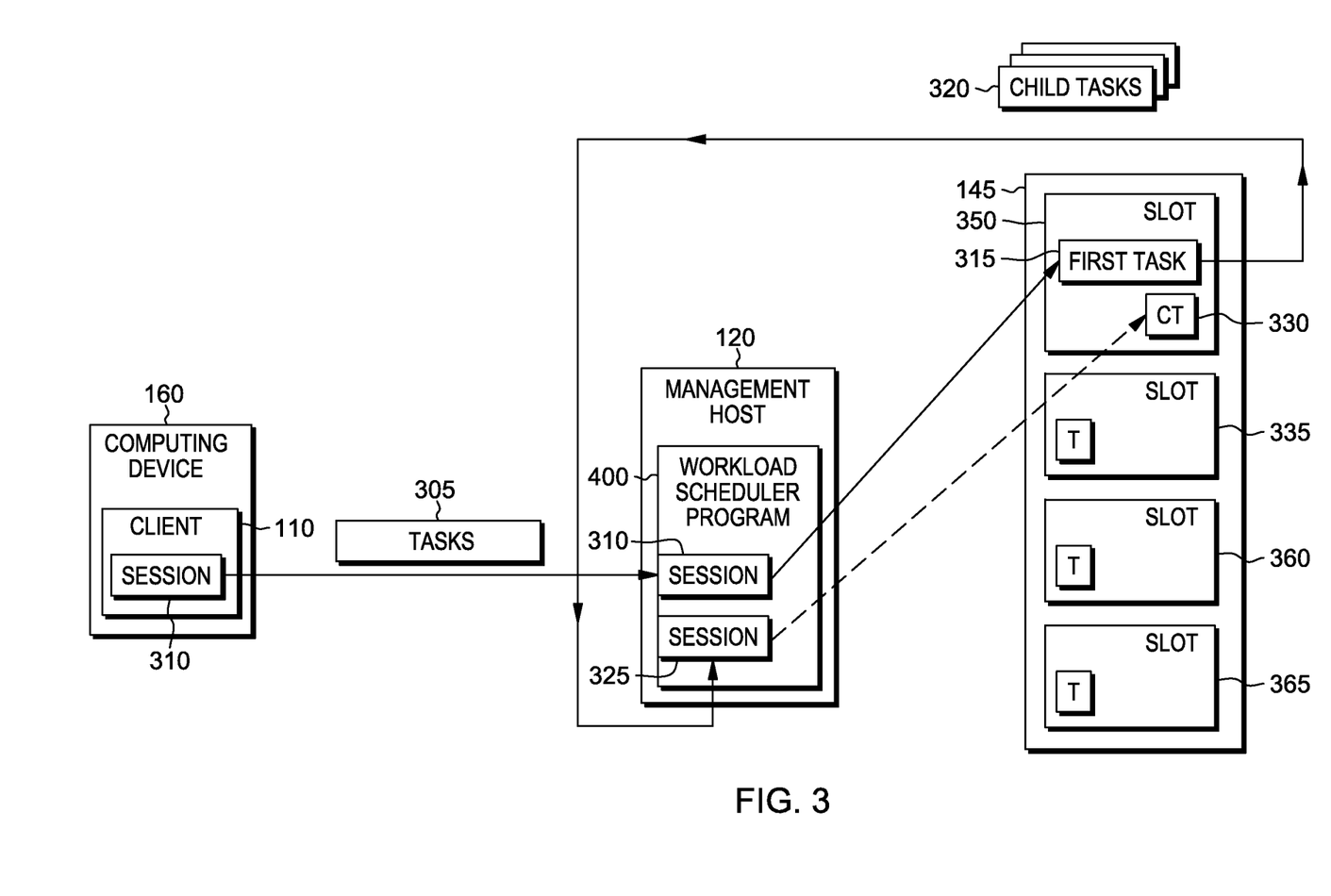
FIG. 3 is a block diagram illustrating an exemplary parent-child workload scheduling pattern in which a parent task yields a resource to a child task, in accordance to an embodiment of the present invention.

FIG. 3 is a block diagram illustrating an exemplary parent-child workload scheduling pattern in which a parent task yields a resource to a child task, in accordance to an embodiment of the present invention. FIG. 3 includes computing device 160 which is operating client 110. Client 110 initiates session 310 which includes tasks 305, which is comprised of one or more tasks. Client 110 submits a request to workload scheduler program 400 to have tasks 305 scheduled on available resource slots. Workload scheduler program 400 is a single logical workload scheduler that maintains control over sessions and tasks and manages the state dependencies and resource dependencies of the tasks. Workload scheduler program 400 has visibility of all pending, running, yielded, and resuming tasks within a parent-child tree of sessions and tasks. Similarly, workload scheduler program 400 has visibility of all pending, running, yielded, and resuming tasks within a recursive tree of sessions and tasks. In one embodiment of the present invention, workload scheduler program 400 is a single instance controlling all scheduling of sessions and tasks for a set of resources as defined by resource manager 130. In another embodiment, workload scheduler program 400 includes multiple instances in which a single instance assumes the role of a master workload scheduler program, directing and receiving information from one or more slave workload schedulers, operating on a subset of sessions and tasks, and receiving direction from the master workload scheduler. This master—slave approach allows the scalability to support a larger number of computing devices than a number managed by a workload scheduler running as a single process, by extending the workload scheduler to multiple processes.

In one embodiment of the present invention, within a computing grid or cluster, such as distributed computing grid 140, whose resources are managed, for example, by resource manager 130, multiple single logical workload schedulers can be in place, as long as the workloads managed by each workload scheduler are independent of the other workload schedulers.

Workload scheduler program 400 determines the tasks to be scheduled and the resource slots available on distributed computing grid 145, and schedules tasks 305 to slots 350, 355, 360, and 365. Workload scheduler program 400 schedules first task 315 of tasks 305 to slot 350. First task 315 is performed on slot 350 and decomposes to produce child tasks 320, making first task 315 a parent task to child tasks 320.

For first task 315 to complete, child tasks 320 must complete and return results to first task 315, so that it can complete. In an embodiment of the present invention, session 325 is initiated and submitted to workload scheduler program 400 by first task 315. First task 315 submits child tasks 320 to workload scheduler program 400. In addition, in executing its task code, first task 315 is in a waiting state, dependent on receiving results from child tasks 320 for first task 315 to complete. First task 315 indicates to workload scheduler program 400 that it is yielding slot 350 due to inactivity while in a waiting state. Workload scheduler program 400 is aware of the availability of slot 350 having been yielded by first task 315 and schedules a backfill task to the yielded resource of slot 350. Backfill is the scheduling action that workload scheduler program 400 takes to schedule another task to a yielded slot. As an example, workload scheduler program 400 schedules one of the tasks of child tasks 320 on slot 350.

In a typical case, the service instance process on which the parent task runs is the client that creates the child session and submits its child tasks to workload scheduler program 400. In an embodiment of the present invention, workload scheduler program 400 enables a second client, such as client 112, to create a second child session and second child task and associate the second child task with an existing session of a first client, such as client 110, forming a parent-child relationship with the parent of the first session. To form the parent-child relationship the parent session ID and parent task ID to which the child session is to be associated may be specified by the second client when submitting the child session to workload scheduler program 400.

Eventually, a set of tasks are reached that do not decompose and will directly produce results. The results are passed back to the immediate parent task, and workload scheduler program 400 schedules another task to fill the slot of the most recently completed task. As results from child tasks 320 complete and are returned to first task 315, an intent to "resume" is sent by first task 315 to workload scheduler program 400 indicating that it is ready to resume its task and for workload scheduler program 400 to schedule first task 315 to slot 350. Workload scheduler program 400 will wait for the current running backfill task to finish and will reschedule the resuming parent task. Workload scheduler program 400 will send a notification to the parent task indicating that it has been scheduled and that it is safe to resume using the slot.

In one embodiment of the present invention, a running parent task may be interrupted or may not complete for any of a variety of reasons, including preemption, reclaim, and failure. Preemption occurs when a priority task managed by the same single logical workload scheduler program, such as workload scheduler program 400, needs to be scheduled and a resource is unavailable. A parent task may be preempted, in which case the parent task is interrupted during its run with a configurable grace period. If the task cannot complete within that grace period, the service instance process where it is running is terminated, the parent task is removed from the resource, and the resource is given to the priority task. The parent task is re-queued to be rescheduled by workload scheduler program 400 when the same slot or a different slot becomes available.

A parent task may be running on a resource that is "loaned" from a resource manager that reclaims the resource while the parent task is running on the resource. The parent task is interrupted during its run with a configurable grace period. If the task cannot complete within that grace period, the service instance process where it is running is terminated, the parent task is removed from the resource, and the resource is given back to the resource manager. The parent task is re-queued to be rescheduled by the workload scheduler program when the same slot or a different slot becomes available.

The parent task in these cases may be non-recoverable or recoverable. Workload scheduler program 400 cleans up the entire sub-tree of a non-recoverable parent task that is failed, preempted or reclaimed. If workload scheduler program 400 is configured to re-run failed tasks, in the case of failure, workload scheduler program 400 will re-run the task that did not complete due to failure. In the case of a recoverable parent task, the parent task checkpoints its progress and state after each significant event, such as after a child task is submitted to the workload scheduler or after results are received from a child task. If the parent task fails, workload scheduler program 400 does not abort the sub-tree of tasks below the parent task. For tasks already submitted to the scheduler, workload scheduler program 400 allows currently running tasks in the parent task sub-tree to continue until they finish, and pending tasks will continue to be dispatched to resources.

When the parent task is re-run, the task can read its checkpoint state and can resume execution from its last known position. This allows the parent task to receive results from completed child tasks without having to resubmit and re-run them. Workload scheduler program 400 can also suspend sessions in the parent task's sub-tree, in which case no pending tasks from the parent task sub-tree will be dispatched to resources while the descendent sessions are in the suspended state. When the parent task is re-run, it can choose when to explicitly un-suspend its descendent sessions. The advantage of this feature is for the parent task to check whether the checkpoint of its state is consistent prior to consuming resources for its sub-tree. If its state is inconsistent, the parent task may not be able to continue and executions of its sub-tree tasks may be wasted.

In another embodiment of the present invention, workload scheduler program 400 assigns a rank to tasks scheduled on resources, corresponding to the position of the running task within the tree structure, such that leaf sessions and tasks have a less important ranking, and are preempted first. In addition, criteria associated with the ranking of the scheduled task can be specified. For example, "the most recent task" criteria instructs workload scheduler program 400 to preempt the lowest ranked task that has the shortest elapsed run time. When evaluating which tasks to preempt on a resource, if there are multiple yielded tasks, resuming tasks, and/or a running task on the resource, workload scheduler program 400 evaluates the session-task scheduled on the resource that is closest to the root in the recursive tree structure. Tasks that are backfilling may no longer be in the yielded state, but may be in a running or resuming state and are considered "slot owners". These tasks are not evaluated for preemption.

Figure 4:
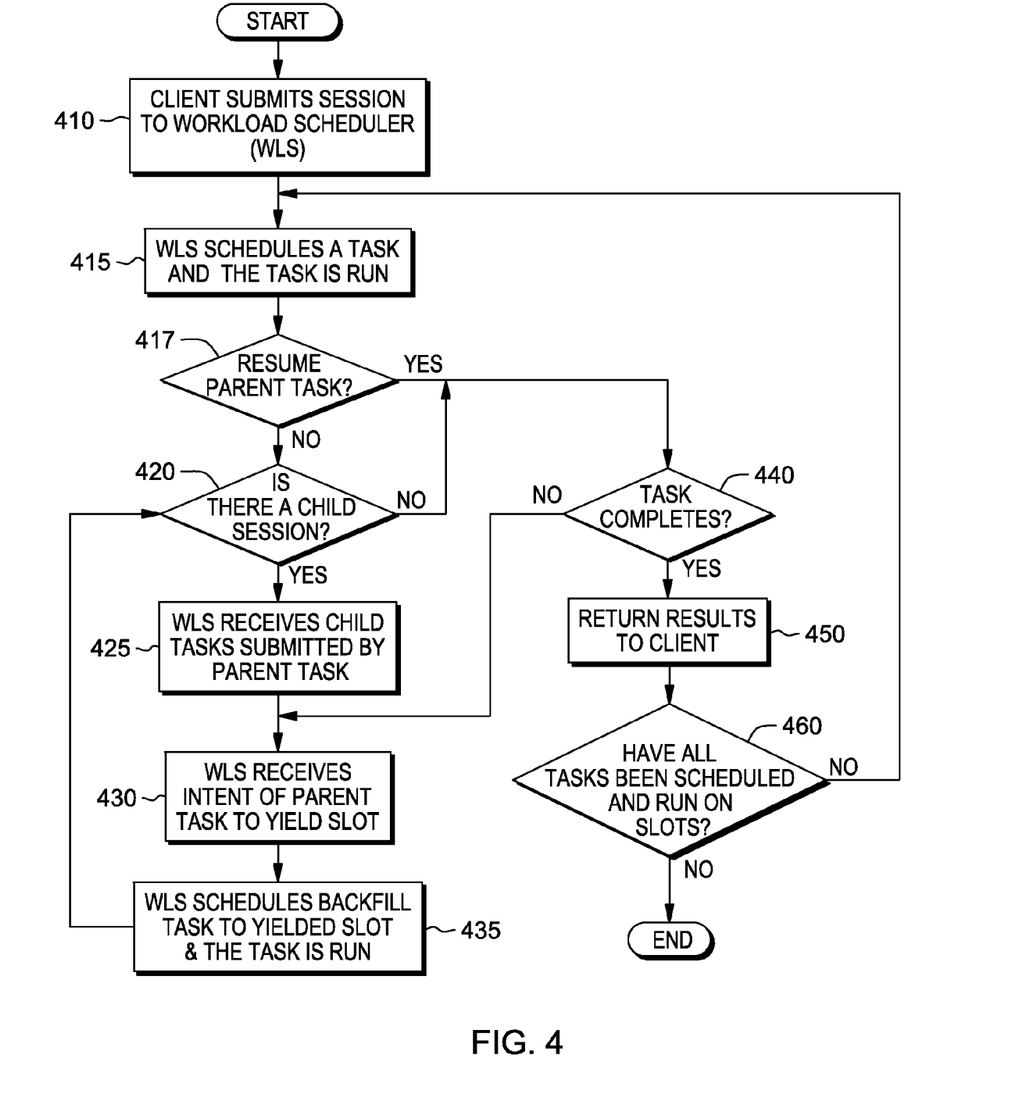
FIG. 4 is a flowchart depicting the operational steps of a workload scheduler program within the distributed computing grid environment of FIG. 1, in accordance with an embodiment of the present invention.

FIG. 4 is a flowchart illustrating operational steps of workload scheduler program 400, in accordance with an embodiment of the present invention. A client application, such as client 110, creates a session and submits the session to the workload scheduler (WLS) (step 410). The workload scheduler, which receives and schedules the tasks submitted via the session. Tasks may be submitted individually to the workload scheduler. For example, client 110 initiates a session and submits the session to workload scheduler program 400 to schedule the tasks associated with the session on resource slots 145 of distributed computing grid 140.

The workload scheduler schedules a task and the task is run on the scheduled slot (step 415). Workload scheduler program 400 schedules a task of the submitted session request considering resource slots available as determined by resources allotted by resource manager 130 and the resource slots in use. The tasks are run and produce a result.

Workload scheduler program 400 determines if there is a request to resume a parent task (decision step 417). If the task is run on a slot that has been yielded by a parent task, workload scheduler program 400 determines if there is a request to resume the parent task. In one embodiment of the present invention, the appropriate point for the resume of a parent task is determined by the application program of the parent task. In the case of an explicit resume, the parent task will send a request to workload scheduler program 400 and will receive a notification from workload scheduler program 400 when the slot yielded by the parent task is available for the parent task to resume.

In another embodiment of the present invention, workload scheduler program 400 may determine an implicit resume when dependencies of the parent task have been met. In such cases the parent task is automatically sent a resume notification from workload scheduler program 400 for continuing use of the slot which the parent program had yielded.

If the task is not run on a slot that has been yielded by a parent task or the parent task does not explicitly request a resume, the workload scheduler program 400 determines that resuming the parent task is not required (step 417, "NO" branch), and checks to determine if there is a child session resulting from the task that was run (decision step 420).

For example, first task 315 (FIG. 3) has no parent task and when it is run on slot 350, workload scheduler program 400 determines if a request to resume was received from a parent task that yielded slot 350. Workload scheduler program 400 determines that slot 350 was not yielded by a parent task and continues to determine if there is a child session resulting from running first task 315.

Workload scheduler program 400 determines if there is a child session resulting from running the task (decision step 420). By receiving a child session submitted by the parent task, workload scheduler program 400 determines that the parent task has decomposed into one or more child tasks (step 420, "YES" branch), and receives child tasks submitted by the parent task (step 425). Running the parent task results in one or more child tasks, and the parent task initiates and submits a child session, which is received by workload scheduler program 400, and using the submitted child session, child tasks are submitted to be scheduled to available resources. For example (referring to FIG. 3), first task 315 on slot 350 results in producing child session 325 and its child tasks 320. Workload scheduler program 400 receives the tasks of child session 325, initiated from first task 315, which implicitly requests scheduling.

The workflow scheduler receives an intent of the parent task to yield its slot (step 430). The parent task scheduled on a resource slot determines that it is in a waiting state and is dependent on the results from the child tasks of a child session before it can complete. The parent task sends a message to workload scheduler program 400 that it intends to yield the resource slot to which it has been scheduled but wants the slot to be returned when results are received so that the parent task may "resume" and complete work to be done in the parent task. Workload scheduler program 400 receives the information that the parent task is yielding the slot and makes the slot available to schedule a backfill task.

For example, workload scheduler program 400 receives a message from first task 315 (FIG. 3), which is the parent task of child tasks 320, that first task 315 intends to yield the resource slot to which it has been scheduled. Workload scheduler program 400 is aware that slot 350 is available to schedule another task (backfill). In the case of an explicit resume, workload scheduler program 400 receives the intent of the parent task, such as first task 315 (FIG. 3), to yield slot 350, and receives a resume request when the application program for first task 315 determines the appropriate point at which to resume running first task 315. In the case of an implicit resume, workload scheduler program 400 receives the intent of the parent task, such as first task 315, to yield slot 350, for example. Workload scheduler program 400 determines when the dependencies for first task 315 have been met and automatically sends a notification to first task 315 to resume on slot 350. In one embodiment of the present invention, generic yield and explicit resume operations can be used when a task temporarily does not have intensive work to be done on the resource slot, but the task will need the slot to be returned when there is intensive work to be done. This gives flexibility to a task to control when to yield and when to resume.

In another embodiment of the present invention, an explicit yield can be used. A task can yield and resume multiple times. An explicit yield can be blocking or non-blocking. A blocking yield is beneficial if the child task results are returned via a callback on another thread. Once all the child task results are returned on the callback, the callback thread can call an API to asynchronously request a resume for the parent task. In this case, the blocking yield API can be called from the task execution thread. The blocking yield API will unblock when the workload scheduler has scheduled the slot back to the parent task.

In yet another embodiment, an explicit yield can be non-blocking as well. A non-blocking yield is beneficial for the case in which the calling thread will retrieve the child task results. In this case, the parent task will call the non-blocking yield API when the parent task wants to yield the resource back to the computing grid, such as distributed computing grid 140. The non-blocking yield API will immediately return, giving execution control back to the calling thread. The calling thread can be used to retrieve the child task results, since it has control again, without the need for creating additional threads or the need for developers to include multi-threaded code. For non-blocking yield, the API used to request a resume will block until the scheduler has scheduled the slot back to the task.

In still another embodiment of the present invention, a parent task can also perform a logical yield, in which the parent task remains in memory but only performs light or minor processing after it yields the resource back to the scheduler so that the resource is not overloaded. Alternatively, a parent task can perform a physical yield in which the parent task checkpoints its state and will be removed from memory after it yields the resource back to the scheduler. The parent task can explicitly request resume when its application program determines the appropriate point, such as specific conditions having been met. The parent tasks requests the workload scheduler to resume. Alternatively, the parent task can implicitly resume when the workload scheduler is aware of dependencies of the parent task having been met, at which point the workload scheduler can notify the parent task to resume. The conditions to be met can be, for example, some or all of the parent task's child tasks are complete and results available to return, or when files or data required by the parent task are retrieved from physical storage.

Workload scheduler program 400 schedules a backfill task to the yielded slot and the task is run (step 435). For example, first task 315 is a parent task of child tasks 320 and after indicating a yield and resume intent, workload scheduler program 400 backfills a task from child tasks 320 to the yielded slot of first task 315, and the child task 330 is run on yielded slot 350. First task 315 remains associated with slot 350 while in a yielding state.

In determining which pending task to schedule as a backfill for the yielded parent task, in addition to session-based scheduling policies of parent-child sessions, workload scheduler program 400 applies specific behaviors for scheduling tasks of recursive tree structures. In one embodiment, a recursive tree structure's resources are allocated to its root session, which is the initial session as submitted by a client application, such as client 110. Root sessions from distinct recursive trees compete with one another for resources. The resources allocated to the root session are shared by descendent sessions, with no explicit allocation for the descendent sessions. This differs from a session-based scheduling policy in which every session independently has its own resource allocation based on its workload, priority, and other factors.

In another embodiment of the present invention, workload scheduler program 400 selects a pending task to be scheduled using a descendent-affinity behavior. Descendent-affinity behavior means that for a given slot, there can be at most one branch of yielded, resuming, or running tasks residing on the slot. Workload scheduler program 400 selects a task from the lowest descendent session of the original task that has the fewest tasks. In terms of a tree structure, this would be the path of sessions with the deepest branches and from amongst the deepest branch, the terminal session with the fewest tasks. The reasons for this behavior are to reduce the number of active sessions and pending tasks that workload scheduler program 400 has to maintain in the tree, to reduce the number of parent tasks in the running state in case they fail or have to be preempted/reclaimed, and to complete a session that is almost done rather than trying to broaden session coverage should parent tasks fail or need to be replaced by a higher priority task via preemption/reclaim.

In the case in which there are no pending descendent tasks available in the session, workload scheduler program 400 uses a tree-affinity behavior to select a task from the lowest session remaining in the entire tree, having the fewest tasks. A tree-affinity behavior is less stringent than the descendant-affinity behavior, and begins by trying to first apply descendant-affinity by keeping one branch of yielding, resuming, or running tasks on the slot. If there are no pending tasks remaining in the branch, the choice of tree-affinity allows tasks from other branches of the same tree to be run on the slot. The lack of pending tasks may be due to tasks in the branch are already running but not yet finished. Without scheduling tasks from another branch of the same tree, the slot remains inefficiently idle. However, the result may be many more tasks yielding, resuming, or running on the slot, and memory usage may become very high.

A third backfill behavior is no-affinity, which is the least stringent. First, attempts are made to schedule a descendant-affinity task, and if no pending tasks remain in the same branch, then a tree-affinity behavior is applied. Attempts are made to schedule backfill tasks that are in the same current tree, and if no pending tasks are found in the current tree, any task from outside of the current tree may be scheduled on the slot. This behavior could also lead to an even greater number of yielded, resuming, or running tasks on the slot with similar memory consumption concerns.

In yet another embodiment of the present invention, workload scheduler program 400 determines if a task is eligible to run on either a yielded resource or a free resource. For those tasks eligible to run on either a yielded resource or a free resource, workload scheduler program 400 preferentially chooses to run the task on a yielded resource. This behavior is directed to efficient use of resources because rules for running tasks on a yielded resource may be more stringent whereas any pending task can be scheduled to run on a free resource. Therefore, if the task is eligible to run on a yielded resource, workload scheduler program 400 preferentially schedules the task to the yielded resource.

Having run the backfill task, workload scheduler program 400 determines whether to resume the parent task (decision step 417) that yielded the slot. If a request to resume has been received by workload scheduler program 400, then workload scheduler program 400 resumes the parent task (step 417, "YES" branch). Workload scheduler 400 allows the current task running on the slot to complete before sending a notification to the parent task to begin resuming its task.

For example, after backfilling a task, such as child task 330 on slot 350 (FIG. 3), child task 330 completes and workload scheduler program 400 determines if the parent task, first task 315, has requested to resume. Having determined that a request to resume was received, or alternatively, if dependencies of an implicit resume have been met, workload scheduler program 400 allows the task on slot 350 to complete, if it has not done so, and sends a notification to first task 315 to begin its resume.

In another exemplary embodiment, first task 315 having yielded the slot to which it has been scheduled and indicating an implicit/automatic resume request, waits for child tasks 320 to complete. Child tasks 320 may have been scheduled on the slot yielded by first task 315, and when the last task of child tasks 320 has completed, workload scheduler program 400 re-schedules first task 315 and sends a notification to first task 315 that it has been rescheduled for the yielded slot, and may resume.

If no request to resume has been received, or, in another embodiment of the present invention, in which the dependencies for an implicit resume have not been met, workload scheduler program 400 determines if the result of the current task run on the slot is a child session (decision step 420). Workload scheduler program 400 determines the decomposition of the task to child tasks by the receipt of the child session and tasks submitted to the child session (step 420, "YES" branch), and continues as described above.

Having sent a notification to begin to the parent task that requested a resume explicitly, or met the dependencies to resume implicitly, workload scheduler program 400 determines if the resumed parent task completes (decision step 440).

Having determined that the parent task has completed and is not yielding the slot, (step 440, "YES" branch), workload scheduler program 400 is aware of the return of results to the client of the parent task (step 450). Workload scheduler program 400 determines that the slot is now available to schedule another task, and that the return of results to the client, which may be another parent task, may initiate a resume request of the other parent task which is further up the branch of the tree structure of parent-child task processing.

Workload scheduler program 400 determines if all tasks have been scheduled and run on slots (decision step 460). If workload scheduler program 400 determines that all tasks have been scheduled and run on slots (step 460, "YES" branch), without further decomposition to child tasks, all results have been returned to the client application and workload scheduler program 400 ends, for the client application. If workload scheduler program 400 determines that not all tasks have been scheduled and run on slots (step 460, "NO" branch), workload scheduler program 400 schedules a task to a slot and the task is run (step 415), and continues as described above.

For example, after a task has completed and the results are returned to the client submitting the session and task, workload scheduler program 400 determines if other tasks are pending, waiting to be scheduled to a slot and run, or if any parent tasks have not completed. If all tasks have been scheduled and have been run with no additional decomposition of parent tasks to a child session, and parent tasks have been completed, workload scheduler program 400 ends for the currently running client application.

If after a task has completed and the results are returned to the client, workload scheduler program 400 determines that other tasks are pending to be scheduled, workload scheduler program 400 schedules a task and the task is run (return to step 415), and workload scheduler program 400 continues as discussed above.

At some point an executed task does not decompose to one or more child tasks. Returning to decision step 420, if the executed task does not decompose to child task(s), (step 420, "NO" branch), then workload scheduler program determines if the task completes (decision step 440). The parent task may yield and resume multiple times during the running of the task. For example, suppose a parent task submitted 100,000 child tasks. It might not be feasible for all 100,000 child task results to fit into memory at the same time. However, it may be possible to process 100 child task results at a time to build a partial aggregate result and then discard the raw results from the child tasks. The parent task resumes to run intermediate results when a subset of child task results are ready, then informs workload scheduler program 400 that it is yielding the slot again, until the next subset of child tasks are ready.

If workload scheduler program 400 determines that the parent task is not complete (step 440, "NO" branch), and is performing intermediate run results, workload scheduler program 400 receives the intent of the parent task to yield the slot (return to step 430) and continues as discussed above.

Figure 5:
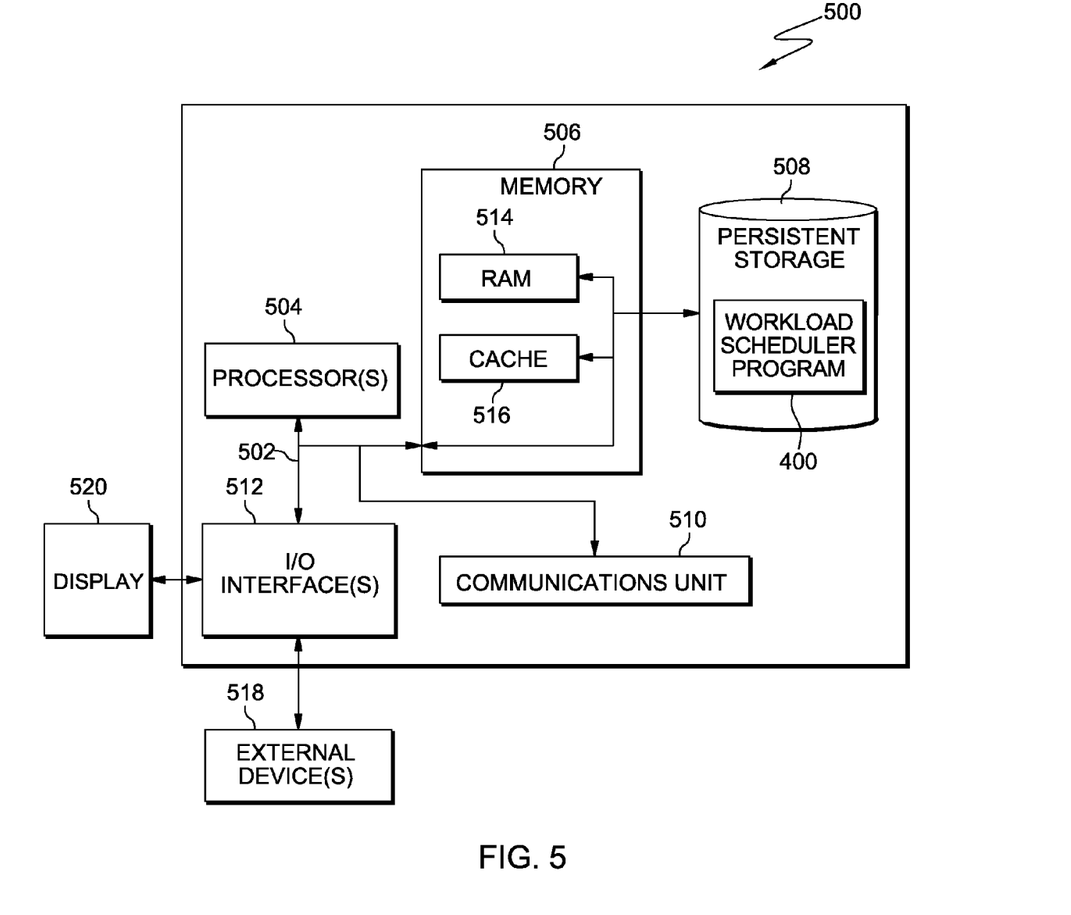
FIG. 5 depicts a block diagram of the components of a computing device capable of operating a workload scheduler program of the distributed computing grid environment of FIG. 1, in accordance with an embodiment of the present invention.

FIG. 5 depicts a block diagram of the components of a computing device 500 capable of operating workload scheduler program 400 within the distributed computing grid environment of FIG. 1, in accordance with an embodiment of the present invention. Components of computing device 500 may be representative of components of management host 120, and computing devices 160 and 170. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or with a network.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Workload scheduler program 400 is stored in persistent storage 508 for execution by one or more of the respective computer processor(s) 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, a read-only memory (ROM), an erasable programmable read-only memory (EPROM), a flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including the resources of distributed computing grid environment 100 and computing devices 160 and 170. In these examples, communications unit 510 includes one or more network interface cards. Communications unit 510 may provide communications through the use of either or both physical and wireless communications links. Workload scheduler program 400 may be downloaded to persistent storage 508 through communications unit 510.

I/O interface(s) 512 allows for input and output of data with other devices that may be connected to server computer 102. For example, I/O interface(s) 512 may provide a connection to external device(s) 518 such as a keyboard, a keypad, a touch screen, and/or some other suitable input device. External device(s) 518 can also include portable computer-readable storage media such as, for example, thumb drives, portable optical or magnetic disks, and memory cards. Software and data used to practice embodiments of the present invention, e.g., workload scheduler program 400, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for parent-child scheduling and management of a computer workload, the computer program product comprising:
   a computer-readable storage medium having computer-readable program code embodied therewith, the computer-readable program code comprising:
   computer-readable program code configured to initiate a parent task of a parent-child workload session submitted by a client application, by scheduling the parent task on a resource available to, and under control of a workload scheduler;
   computer-readable program code configured to receive a request to schedule one or more child tasks as a result of performing at least part of the parent task of the parent-child workload session, wherein the parent task of the parent-child workload session is dependent on a result of the one or more child tasks, wherein each of the one or more child tasks are descendants of the parent task and are arranged in a generation of child tasks wherein at least one child task that becomes a parent task of one or more child tasks becomes a parent task of a subsequent generation of child tasks, wherein the one or more generations of child tasks are arranged in an inverted tree structure with a first parent task as a root task with descendent child tasks, wherein branches of the inverted tree structure connect each generation of child tasks with the root task, and wherein each branch ends with at least one terminal task, which is at least one child task that has no descendant child tasks;
   computer-readable program code configured to receive a message from the parent task of the parent-child workload session to the workload scheduler, yielding the resource on which at least part of the parent task has been performed, wherein the workload scheduler schedules a child task of the branch of the inverted tree structure that includes the parent task, and having a fewest number of generations of child tasks on the resource yielded by the parent task;
   computer-readable program code configured to determine a resume request for the parent task; and
   computer-readable program code configured to return the resource yielded by the parent task to the parent task, upon completion of the child task of the branch of the inverted tree structure that includes the parent task of the parent-child workload session having a fewest number of generations of child tasks, and receipt by the parent task of dependencies from the completion of the child task.

2. The computer program product of claim 1, further comprising:
   computer-readable program code configured to automatically return the resource yielded by the parent task to the parent task, based on determining dependencies of the parent task on the one or more child tasks of the parent task that have been met by the parent task receiving results returned from the one or more child tasks.

3. The computer program product of claim 1, further comprising:
   computer readable program code configured to create a child task by a second client application, wherein the child task is associated with an existing parent task of a first client application, forming a parent-child relationship between the child task of the second client application and the existing parent task of the first client application.

4. The computer program product of claim 1, further comprising:
   computer-readable program code configured to determine if a child task is eligible to run on either of a free resource or the resource yielded to the workload scheduler; and
   in response to determining that the child task is eligible to run on either of the free resource or the resource yielded to the workload scheduler, computer-readable program code configured to schedule the child task to run on the resource yielded to the workload scheduler in preference to the free resource.

5. The computer program product of claim 1, further comprising:
   computer-readable program code configured to assign a preemption rank to the parent and child tasks that are scheduled within the inverted tree structure, wherein the preemption rank is based on whether the resource scheduled to run a task of the parent-child workload session of tasks is borrowed from a separate client application, and on a relative position of the generation of the child tasks on the inverted tree structure of the parent-child workload session, and wherein child tasks of subsequent generations are assigned lower ranks; and computer-readable program code configured to select for preemption, the task of the parent-child workload session of tasks having the lowest rank within the inverted tree structure of the parent-child workload session.

6. A computer system for parent-child scheduling and management of a computer workload, the computer system comprising:

one or more computer processors;

one or more computer-readable storage media;

program instructions stored on the computer-readable storage media for execution by at least one of the one or more processors, the program instructions comprising:

program instructions to initiate a parent task of a parent-child workload session, submitted by a client application, by scheduling the parent task on a resource available to and under control of a workload scheduler;

program instructions to receive a request to schedule one or more child tasks as a result of performing at least part of the parent task of the parent-child workload session, wherein the parent task of the parent-child workload session is dependent on a result of the one or more child tasks, wherein each of the one or more child tasks are descendants of the parent task and are arranged in a generation of child tasks, wherein at least one child task becomes a parent task of the one or more child tasks of a subsequent generation of child tasks, wherein the one or more generations of child tasks are arranged in an inverted tree structure with a first parent task as a root task with descendent child tasks, wherein branches of the inverted tree structure connect each generation of child tasks with the root task, and wherein each branch ends with at least one terminal task, which is at least one child task that has no descendant child tasks;

program instructions to receive a message from the parent task of the parent-child workload session to the workload scheduler, yielding the resource on which at least part of the parent task has been performed, wherein the workload scheduler schedules a child task of the branch of the inverted tree structure that includes the parent task, and having a fewest number of generations of child tasks, on the resource yielded by the parent task;

program instructions to determine a resume request for the parent task; and program instructions to return the resource yielded by the parent task to the parent task, upon completion of the child task of the branch of the inverted tree structure that includes the parent task of the parent-child workload session having a fewest number of generations of child tasks, and receipt by the parent task of dependencies from the completion of the one or more child tasks.

7. The computer system of claim 6, wherein a child task is created by a second client application, and wherein the child task is associated with an existing parent task of a first client application, forming a parent-child relationship between the child task of the second client application and the existing parent task of the first client application.

8. The computer system of claim 6, wherein the workload scheduler is implemented as a master workload scheduler operating to provide direction to one or more slave workload schedulers, wherein the one or more slave workload schedulers receive the parent task and one or more child tasks of the parent-child workload session to schedule, based at least in part on information received from the master workload scheduler.

9. The computer system of claim 6, wherein program instructions to return the resource yielded by the parent task to the parent task based on receiving a resume request, further comprises:

program instructions to send a notification to the parent task indicating the resource yielded is available for the parent task to use based, at least in part, on determining an implied resume request for the parent task, upon receipt of dependencies from the one or more child tasks that are completed, of the parent-child workload session.

* * * * *